US009503238B2

(12) United States Patent
Jl et al.

(10) Patent No.: US 9,503,238 B2
(45) Date of Patent: Nov. 22, 2016

(54) CONTROL CHANNEL TRANSMISSION METHOD AND APPARATUS FOR TRANSMITTING DEDICATED REFERENCE SIGNAL IN WIRELESS COMMUNICATION SYSTEM

(75) Inventors: Hyoungju Jl, Seoul (KR); Yousun Kim, Gyeonggi-do (KR); Jinkyu Han, Seoul (KR); Youngbum Kim, Seoul (KR); Cheng Shan, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/481,163

(22) Filed: May 25, 2012

(65) Prior Publication Data

US 2012/0300718 A1 Nov. 29, 2012

(30) Foreign Application Priority Data

May 25, 2011 (KR) ........................ 10-2011-0049433

(51) Int. Cl.
*H04W 4/00* (2009.01)
*H04L 5/00* (2006.01)
(52) U.S. Cl.
CPC ........... *H04L 5/0051* (2013.01); *H04L 5/0023* (2013.01); *H04L 5/0053* (2013.01); *H04L 5/0007* (2013.01); *H04L 5/0094* (2013.01)
(58) Field of Classification Search
None
See application file for complete search history.

(56) References Cited

U.S. PATENT DOCUMENTS

| 8,355,367 | B2 | 1/2013 | Han et al. |
| 8,942,322 | B2 | 1/2015 | Seo et al. |
| 2002/0009061 | A1 | 1/2002 | Willenegger |
| 2004/0029586 | A1* | 2/2004 | Laroia et al. ................. 455/434 |
| 2007/0121543 | A1* | 5/2007 | Kuchibhotla et al. ......... 370/329 |
| 2009/0088148 | A1* | 4/2009 | Chung et al. ................. 455/423 |
| 2010/0254268 | A1 | 10/2010 | Kim et al. |
| 2011/0044259 | A1* | 2/2011 | Nimbalker .............. H04L 5/001 370/329 |

(Continued)

FOREIGN PATENT DOCUMENTS

| EP | 1 988 667 | 11/2008 |
| EP | 2 124 368 | 11/2009 |

(Continued)

OTHER PUBLICATIONS

Intel Corporation, "Discussions on UE-RS Based PDCCH", R1-111594, 3GPP TSG RAN WG1 Meeting #65, May 9-13, 2011.

(Continued)

*Primary Examiner* — Candal Elpenord
*Assistant Examiner* — Hardikkumar Patel
(74) *Attorney, Agent, or Firm* — The Farrell Law Firm, P.C.

(57) ABSTRACT

Methods and apparatus for receiving a first control channel and a second control channel in a wireless communication system are provided. Control information for receiving the second control channel from a base station is received through higher layer signaling. A second control channel resource is determined from an entire control channel resource based on the control information. A first control channel resource is determined from the entire control channel resource according to the second control channel resource.

16 Claims, 11 Drawing Sheets

(56) References Cited

U.S. PATENT DOCUMENTS

| | | | |
|---|---|---|---|
| 2011/0194551 A1* | 8/2011 | Lee | H04B 7/0626 370/342 |
| 2011/0249646 A1 | 10/2011 | Lee et al. | |
| 2012/0120891 A1* | 5/2012 | Mazzarese | H04W 72/042 370/329 |
| 2012/0140726 A1 | 6/2012 | Moon et al. | |
| 2012/0207099 A1* | 8/2012 | Lindh | H04L 5/0057 370/329 |
| 2012/0207126 A1* | 8/2012 | Qu et al. | 370/330 |

FOREIGN PATENT DOCUMENTS

| | | | |
|---|---|---|---|
| KR | 1020080085770 | 9/2008 | |
| KR | EP 1988667 A2 * | 11/2008 | H04W 72/14 |
| KR | 1020100095129 | 8/2010 | |
| KR | 1020100110272 | 10/2010 | |
| KR | 1020110014101 | 2/2011 | |
| RU | 99 215 | 11/2010 | |
| WO | WO 02/065667 | 8/2002 | |
| WO | WO 2008/115110 | 9/2008 | |
| WO | WO 2011/021852 | 2/2011 | |
| WO | WO 2011/025218 | 3/2011 | |

OTHER PUBLICATIONS

New Postcom, "Remaining Issues on R-PDCCH Search Space", R1-105953, 3GPP TSG-RAN1#63, Nov. 15-19, 2010.
Panasonic, "DMRS Port Indication with MU-MIMO Considerations", R1-101264, 3GPP TSG RAN WG1 Meeting #60, Feb. 22-26, 2010.
3rd Generation Partnership Project; Technical Specification Group Radio Access Network; Evolved Universal Terrestrial Radio Access (E-UTRA); Physical Layer for Relaying Operation (Release 10), 3GPP TS 36.216 V10.0.0, Sep. 2010.
European Search Report dated Oct. 6, 2014 issued in counterpart application No. 12789966.4-1851.
Russian Office Action dated Jan. 26, 2016 issued in counterpart application No. 2013152163/07, 10 pages.
Russian Office Action dated May 10, 2016 issued in counterpart application No. 2013152163/07, 16 pages.
Chinese Office Action dated Jul. 27, 2016 issued in counterpart application No. 201280025416.8, 18 pages.
3rd Generation Partnership Project; Technical Specification Group Radio Access Network; Evolved Universal Terrestrial Radio Access (E-UTRA).
Physical Layer Procedures (Release 10), 3GPP TS 36.213 V10.1.0, Mar. 30, 2011, 115 pages.
European Search Report dated Sep. 22, 2016 issued in counterpart application No. 12789966.4-1851, 7 pages.

* cited by examiner

CONTROL CHANNEL TRANSMISSION METHOD AND APPARATUS FOR TRANSMITTING DEDICATED REFERENCE SIGNAL IN WIRELESS COMMUNICATION SYSTEM

PRIORITY

This application claims priority under 35 U.S.C. 119(a) to an application filed in the Korean Intellectual Property Office on May 25, 2011, and assigned Serial No. 10-2011-0049433, the contents of which are incorporated herein by reference.

BACKGROUND OF THE INVENTION

1. Field of the Invention

The present invention relates generally to a wireless communication system and, more particularly, to a Dedicated Control CHannel (DCCH) transmission method and apparatus for transmitting Dedicated Reference Signal (DRS) in a wireless communication system.

2. Description of the Related Art

Mobile communication systems have been developed in order to provide subscribers with voice communication services while they are on the move. Mobile communication systems have evolved to support high-speed data communication services as well as standard voice communication services. However, limited resource and user requirements for higher speed services in current mobile communication systems have spurred the evolution of more advanced mobile communication systems.

The next generation mobile communication systems of the 3$^{rd}$ Generation Partnership Project (3GPP), Long Term Evolution (LTE) and LTE-Advanced (LTE-A), are currently being standardized. LTE-A is a technology for realizing high-speed packet-based communication at about up to 1 Gigabit per second (Gbps). In order to achieve this speed, several schemes, such as network multiplexing, are being developed for deploying multiple overlapped evolved Node Bs (eNBs) in a specific area and increasing frequency bands supported by an eNB.

In LTE, the control channel is designed based on the distributed transmission concept. This concept aims to minimize and distribute inter-cell interference and maximize frequency diversity gain. LTE-A is designed in consideration of an environment having high inter-cell interference probability due to the very closely deployed cells. Accordingly, the control channel designed based on the distributed transmission scheme inevitably has inter-cell interference. Particularly, in LTE-A supporting Multi-User-Multiple Input Multiple Output (MU-MIMO) transmission, it is difficult to fulfill the performance requirement with the control channel designed for LTE. Accordingly, a new control channel is being developed for transmission on a specific frequency region. Since this specific frequency region is received by a specific User Equipment (UE), the transmission is made based on a dedicated reference signal. A new dedicated control channel region is defined for the UE.

Orthogonal Frequency Division Multiplexing (OFDM) is a transmission technique for transmitting data using multiple carriers. Specifically, OFDM is a multicarrier data transmission technique that parallelizes the serial input stream into parallel data streams and modulates the data streams onto the orthogonal multiple carriers, i.e., sub-carrier channels.

The origin of the multicarrier modulation scheme started in the late 1950's with the microwave radio for military communication purposes. OFDM using orthogonal overlapping multiple subcarriers was developed in the 1970's but was limited in its application to real systems due to the difficulty in implementing orthogonal modulations between multiple carriers. With the introduction of the use of a Discrete Fourier Transform (DFT) for implementation of the generation and reception of OFDM signals, by Weinstein, in 1971, OFDM technology has developed rapidly. Additionally, the introduction of a guard interval at the start of each symbol, and use of a Cyclic Prefix (CP) help to overcome negative effects caused by multipath signals and delay spread.

Owing to such technical advances, OFDM technology is applied in various digital communications fields such as Digital Audio Broadcasting (DAB), Digital Video Broadcasting (DVB), Wireless Local Area Network (WLAN), and Wireless Asynchronous Transfer Mode (WATM). Specifically, the implementation of OFDM was accomplished by reducing implementation complexity with the introduction of various digital signal processing technologies, such as, Fast Fourier Transform (FFT) and Inverse Fast Fourier Transform (IFFT).

OFDM is similar to Frequency Division Multiplexing (FDM), but much more spectrally efficient in achieving high-speed data transmission, by overlapping multiple sub-carriers orthogonally. Due to the spectral efficiency and robustness to the multipath fading, OFDM has been considered a prominent solution for broadband data communication systems.

OFDM is advantageous in that it is able to control Inter-symbol Interference (ISI) using the guard interval and reduce the complexity of equalizer in view of hardware as well as spectral efficiency and robustness to the frequency selective fading and multipath fading. OFDM also maintains a robustness against impulse noise so as to be employed in various communication systems.

In wireless communications, high-speed, high-quality data services are generally hindered by channel environments. In wireless communications, the channel environments suffer from frequent changes not only due to Additive White Gaussian Noise (AWGN), but also power variation of received signals, caused by a fading phenomenon, i.e., shadowing, which is a Doppler effect brought about by movement of a UE and a frequent change in a velocity of the UE, and interference by other users or multipath signals. Therefore, in order to support high-speed, high-quality data services in wireless communication, there is a need to efficiently overcome the above channel quality degradation factors.

In OFDM, modulation signals are located in the two-dimensional time-frequency resources. Resources on the time domain are divided into different OFDM symbols, and are orthogonal with each other. Resources on the frequency domain are divided into different tones, and are also orthogonal with each other. Specifically, the OFDM scheme defines one minimum unit resource by designating a particular OFDM symbol on the time domain and a particular tone on the frequency domain. The unit resource is referred to as a Resource Element (RE). Since different REs are orthogonal with each other, signals transmitted on different REs can be received without causing interference to each other.

A physical channel is a channel defined on the physical layer for transmitting modulation symbols obtained by modulating one or more coded bit sequences. In an Orthogonal Frequency Division Multiple Access (OFDMA) system, a plurality of physical channels can be transmitted depending on the usage of the information sequence or the receiver. The transmitter and the receiver determine REs on which a physical channel is transmitted, which is a process referred to as mapping.

The LTE and LTE-A systems are the representative systems, which adopt OFDM in downlink and Single Carrier-Frequency Division Multiple Access (SC-FDMA) in up link.

SUMMARY OF THE INVENTION

The present invention has been made to address at least the above problems and/or disadvantages and to provide the advantages described below. Accordingly, an aspect of the present invention provides a control channel transmission method and apparatus that is capable of efficiently managing the ratio between the a control channel region carrying a common reference signal and a dedicated control channel region carrying a dedicated reference signal, while maintaining the control channel reception efficiency without an extra demodulation attempt of the UE.

In accordance with an aspect of the present invention, a control channel reception method of a terminal for receiving a first control channel and a second control channel in a wireless communication system is provided. Control information for receiving the second control channel from a base station is received through higher layer signaling. A second control channel resource is determined from an entire control channel resource based on the control information. A first control channel resource is determined from the entire control channel resource according to the second control channel resource.

In accordance with another aspect of the present invention, a terminal for receiving a first control channel and a second control channel in a wireless communication system is provided. The terminal includes a communication unit that receives control information for receiving the second control channel through higher layer signaling. The terminal also includes a controller that determines a second control channel resource from an entire control channel resource based on the control information, and determines a first control channel resource from the entire control channel resource according to the second control channel resource.

In accordance with another aspect of the present invention, a control channel transmission method of a base station is provided for transmitting a first control channel and a second control channel in a wireless communication system. Control information necessary for a UE to receive the second control channel is generated. The control information is transmitted to the UE through higher layer signaling. At least one of the first control channel and the second control channel is transmitted to the UE. The UE determines a second control channel resource from an entire control channel resource based on the control information, and determines a first control channel resource from the entire control channel resource according to the second control channel resource.

In accordance with still another aspect of the present invention, a base station is provided for transmitting a first control channel and a second control channel in a wireless communication system. The base station includes a controller that generates control information necessary for a terminal to receive the second control channel. The base station also includes a communication unit that transmits the control information to the terminal through higher layer signaling, and transmits at least one of the first control channel and the second control channel. The UE determines a second control channel resource from an entire control channel resource based on the control information, and determines a first control channel resource from the entire control channel resource according to the second control channel resource.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
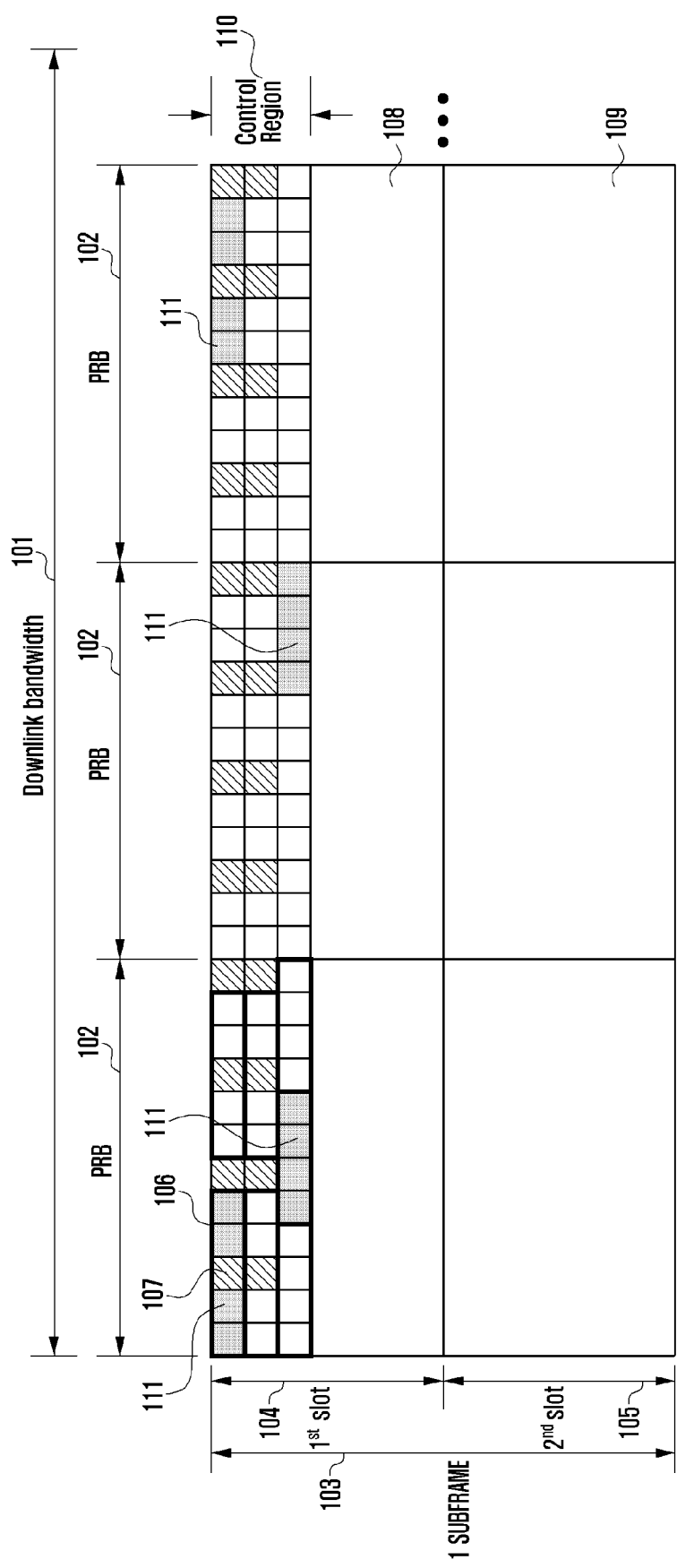
FIG. 1 is a diagram illustrating a control channel structure of a subframe for use in an LTE system to which embodiments of the present invention are applied.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The terms and words used in this description and the appended claims are not to be interpreted by common or lexical meaning but instead, based on the principle that an inventor can adequately define the meanings of terms to best describe the invention, to be interpreted in the meaning and concept conforming to the technical concept of the present invention.

Although the embodiments of the present invention are directed to the Advanced Evolved Universal Terrestrial Radio Access (E-UTRA) (or LTE-A) system, it will be understood by those skilled in the art that the subject matter of the present invention can be applied to other mobile communication systems supporting base station scheduling with a slight modification, without departing from the sprit and scope of the present invention.

FIG. 1 is a diagram illustrating a control channel structure of a subframe for use in the LTE system, and to which the present invention is applied.

The subframe is configured to support backward compatibility in the LTE system.

Referring to FIG. 1, an entire downlink bandwidth 101 is divided into a plurality of Physical Resource Blocks (PRBs) 102 and, as a basic unit of resource allocation, each PRB 102 consists of 12 tones in frequency domain and 14 or 12 OFDM symbols in time domain. Each subframe 103 spans 1 ms and consists of a first slot 104 and a second slot 105.

A Reference signal (RS) is a signal transmitted by the eNB for the UE's channel estimation, and is categorized into one of a CRS and a DRS. A CRS 107 is transmitted through antenna ports 0 and 1 of the eNB having two transmit antennas and antenna ports 0, 1, 2, and 3 of the eNB having four transmit antennas. If the number of antenna ports is more than 1, this means that multi-antenna scheme is adopted. In frequency domain, the absolute position of the PRB is configured differently depending on the cell while maintaining a relative distance between PRBs. Specifically, the RS is transmitted at an interval of 6 PRBs per antenna port. The absolute position of the PRB is configured differently for the cells to avoid RS collision among cells. The number of RSs differs according to the antenna port. For the antenna ports 0 and 1, a total of 8 RSs exist in a single PRB or subframe, while for the antenna ports 2 and 3, a total of 4 RSs exist in a single PRB or subframe. The CRS is configured in order for all UEs to receive the CRS and thus the same pattern is applied to all of the PRBs across entire downlink bandwidth 101.

The DRS is transmitted through multiple ports like the CRS. However, although it depends on the configuration scheme, the LTE system uses two ports and two scrambling codes. In LTE-A system, it is possible to use four ports and two scrambling codes. The DRS is transmitted in data regions 108 and 109 of a specific PRB to a specific UE, but not across the entire downlink bandwidth 101.

The control channel signal of LTE is arranged at the beginning of a subframe in time domain. In FIG. 1, control region 110 is the region in which the control channel signal is transmitted. The control channel signal may be transmitted on L consecutive OFDM symbols at the beginning of the subframe. L can be set to 1, 2, or 3. FIG. 1 is directed to an embodiment in which L is equal to 3. If the necessary control channel amount is small, it is possible to use the first 1 OFDM symbol to transmit the control channel signal (L=1), while using the remaining 13 OFDM symbols for data channel signal transmission. L can be used as the basic information for allocated control channel resource demapping in a control channel reception operation such that, if L is received, it is impossible to recover the control channel. The control channel signal is located at the beginning of the subframe so that the UE may determine whether to perform a data channel reception operation depending on the presence of the data channel signal addressed to the current UE. If there is no data channel signal addressed to the UE, it is not necessary for the UE to attempt data channel decoding, thereby saving power consumption required for data channel reception. Also, by receiving the control channel at the beginning of the subframe prior to the data channel, it is possible to reduce scheduling delay.

A Physical Downlink Control CHannel (PDCCH) is a physical channel for transmitting a common control channel and a dedicated control channel including, for example, data channel allocation information, allocation information for system information transmission or power control information. The PDCCH can be configured with different channel coding rates, depending on the channel state of the UE. Since the Quadrature Phase Shift Keying (QPSK) is fixedly used for PDCCH transmission, it is necessary to change the resource amount in order to change the channel coding rate. A UE operating in a good channel condition uses a high channel coding rate to reduce the resource amount. A UE operating in a bad channel condition uses a low channel coding rate although it requires a greater resource amount. The resource amount for each PDCCH is determined depending on the unit of a Control Channel Element (CCE). A CCE consists of a plurality of Resource Element Groups (REGs) 111. The REG 105 of the PDCCH is interleaved to guarantee diversity and distribute inter-cell interference. The REG 105 is allocated in the control channel region of the PRBs 102 across the entire bandwidth as denoted by reference numbers 105 and 106 in FIG. 1.

Interleaving is performed to all of the REGs of the subframe that are determined by L. The output of the control channel interleaving is designed to space the REGs of the control channel, allocated across one or more symbols, far enough to acquire diversity gain while avoiding inter-cell interference caused by the use of the same interleaver for the cells. Also, it guarantees uniform distribution of the REGs constituting the same channel across the per-channel symbols.

In an advanced environment provided in a recent LTE-A system, however, it is assumed that a large number of eNBs, which are different in size, are deployed within an area. This deployment increases interference per unit square such that the PDCCH designed for preventing inter-cell interface fail to mitigate interference and is influenced by more interference from neighbor cells, resulting in a reduction of UE coverage. Furthermore, an eNB adopting the MU-MIMO technique for scheduling more UEs and maximizing the system throughout, lacks the control channel amount while having an adequate data channel amount, resulting in a scheduling failure. In order to overcome this problem, a control channel is transmitted using a dedicated reference signal on the legacy data channel. When transmitting a control channel on the data channel, it is possible to avoid inter-cell interference and utilize the dedicated reference signal. As a consequence, multiple antennas can be used to transmit the control channel for multiple UEs on the same resource, resulting in maximization of control channel capacity.

Figure 2:
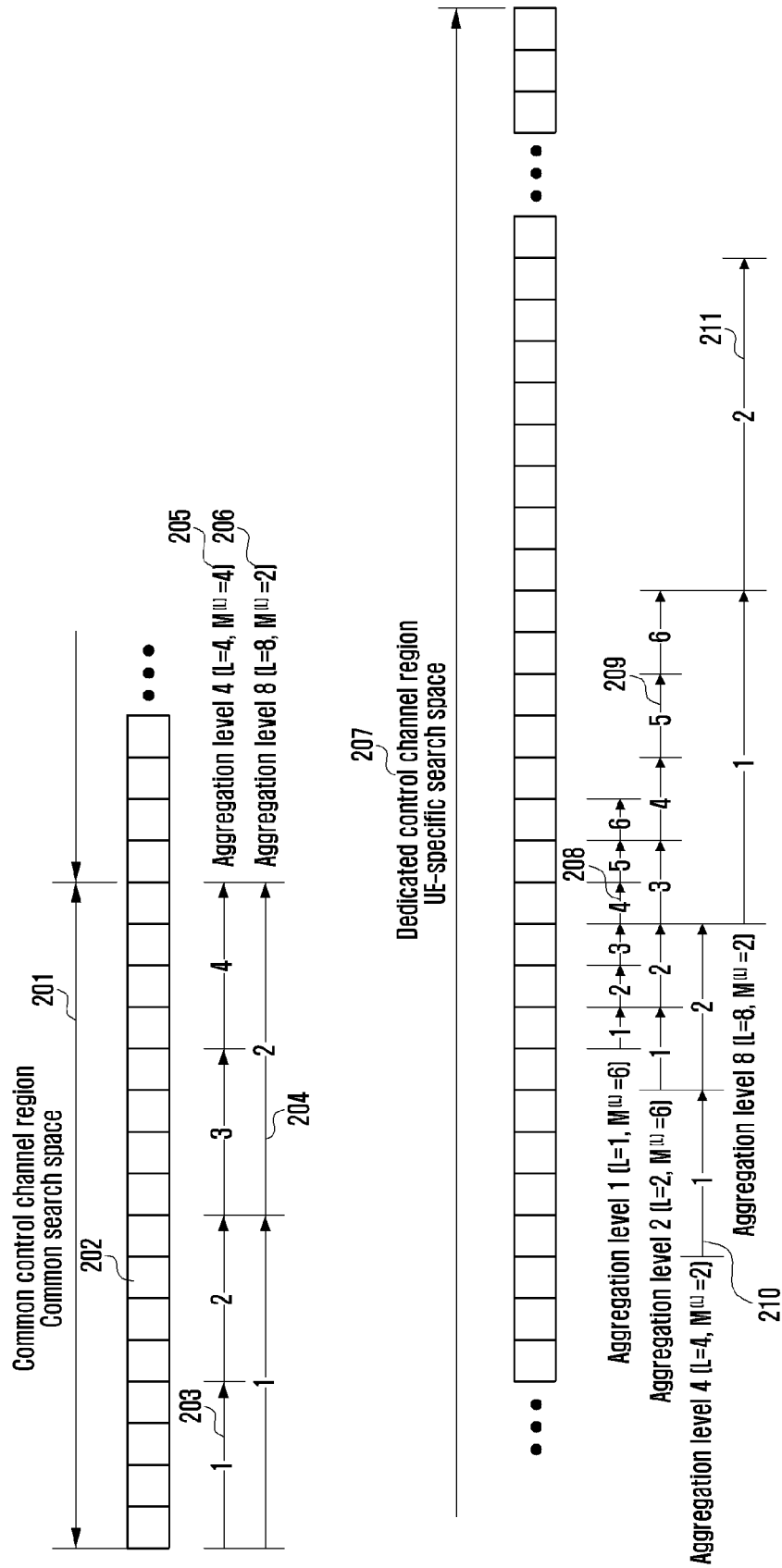
FIG. 2 is a diagram illustrating a configuration of control channels for use in the LTE system, according to an embodiment of the present invention.

FIG. 2 is a diagram illustrating a configuration of control channels for use in the LTE system, according to an embodiment of the present invention.

The LTE control channel is divided into a common control channel region 201 and a dedicated control channel region 207. The common control region 201 is the region in which control channel demodulation is always attempted. The dedicated control channel region 207 is divided into UE-specific parts in which control channel demodulation is attempted by respective UEs. A CCE 202 is a unit for transmitting the control channel. The common control channel region 201 is composed of 16 CCEs, while the remaining CCEs are used for the dedicated control channel region 207. In the LTE system, the control channel is not fixed in code rate, and its information amount to the resource is determined using a unit referred to as an aggregation level. The available aggregation levels are 4 and 8 for the common reference signal and 1, 2, 4, and 8 for the dedicated reference signal. The unit of aggregation is the CCE 202. A blind demodulation zone 203 in provided in the common control channel region 201 according to the aggregation level. For available aggregation level 4 205, 4 blind demodulation zones 203 can be transmitted. For available aggregation level 8 206, 2 blind demodulation zones 204 can be transmitted. Accordingly, the eNB can transmit the common control channel using 6 blind demodulation zones. For the UE-specific control channel, the number of decoding iterations differs according to the aggregation level. For levels 1 and 2, 6 blind demodulation zones are possible, as denoted by reference numbers 208 and 209, respectively. For levels 4 and 8, 2 blind demodulation zones are possible, as denoted by reference numbers 210 and 211, respectively. Blind demodulation can be performed to the same or different CCEs, according to the aggregation level, as shown in Table 1 below.

TABLE 1

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

The CCEs to be used are determined according to Equation (1), in which L denotes an aggregation level and $N_{CC,K}$ denotes the total number of CCEs of $k^{th}$ subframe. A CCE index for blind demodulation is derived from Equation (1). $Y_k$ denotes a random variable for distributing user-specific control channels across the entire control channel region to avoid collision among the control channels, and changes at every subframe by Equation (2). However, for common control channel, $Y_k$ is set to 0 in order for all of the UEs to receive the signals in the same regions. The start of the $Y_k$ is a UE ID, A is 39827, and D is 65537.

$$L \cdot \{(Y_k+m) \bmod \lfloor N_{CCE,k}/L \rfloor\}+i, m=0, \ldots, M^{(L)}-1, i=0, \ldots, L-1$$

$$Y_k=(A \cdot Y_{k-1}) \bmod D \quad (2)$$

Figure 3:
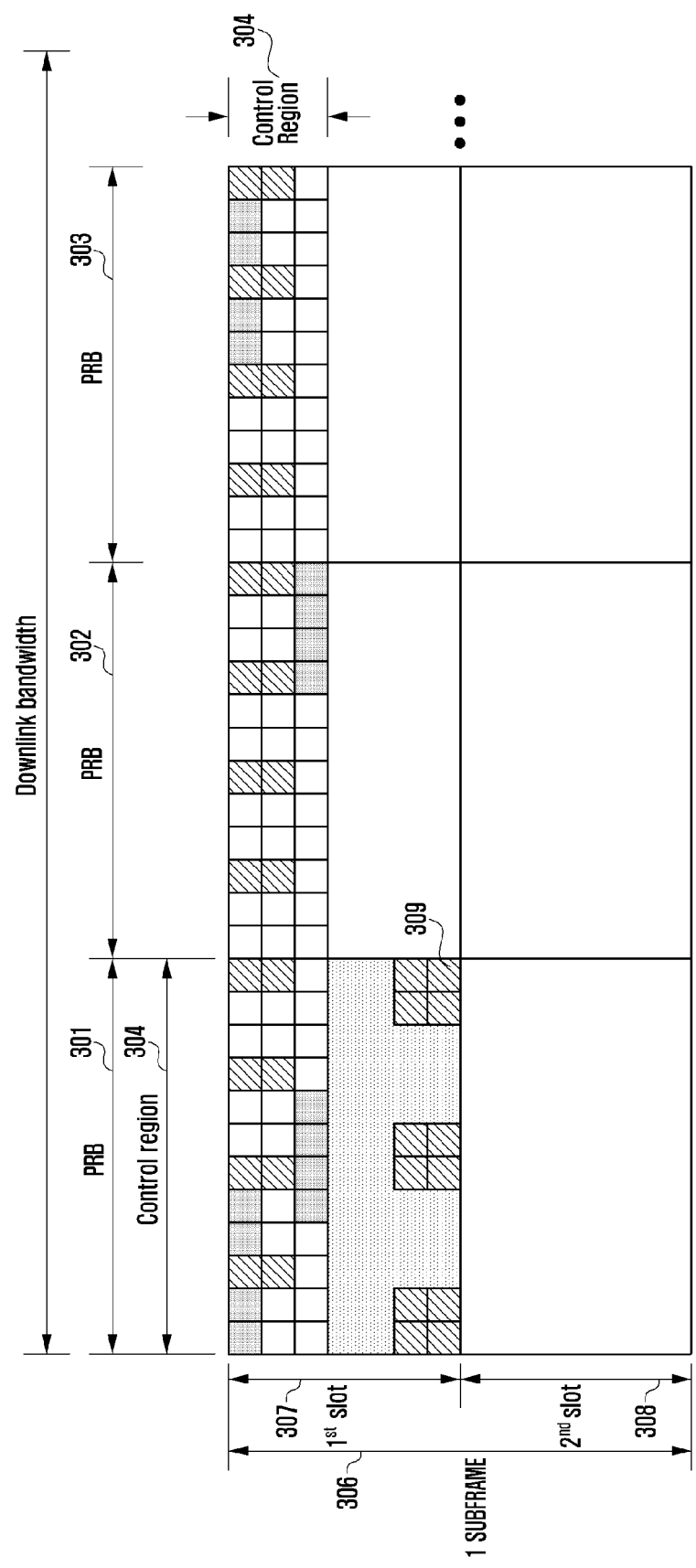
FIG. 3 is a diagram illustrating a control channel structure of a subframe designed to carry the dedicated reference signal, according to an embodiment of the present invention.

FIG. 3 is a diagram illustrating a control channel structure of a subframe designed to carry the dedicated reference signal, according to an embodiment of the present invention.

A downlink bandwidth is shown in FIG. 3, having a first PRB 301, a second PRB 302, and a third PRB 303. A first subframe 306 is divided into a first slot 307 and a second slot 308. A control region 304 includes the first three REs of the first slot 307 in the first PRB 301.

A dedicated reference signal 309 is transmitted in the data channel region, as shown in FIG. 3, where only the first slot 307 is depicted with the dedicated signal. The dedicated control channel can be transmitted as some symbols in the time domain, or some slots or entire PRBs. The dedicated reference signal should be transmitted at specific PRBs in the frequency domain. FIG. 3 is depicted under the assumption that the dedicated control channel is transmitted at the first slot 307 of the first PRB 301. Since, in the legacy LTE system, the control channel reception is configured only in the PDCCH region, it is impossible to receive the control channel using the dedicated reference signal as shown in FIG. 3. Accordingly, there is a need to configure a control channel region for supporting control channel receipt using the dedicated reference signal.

Figure 4:
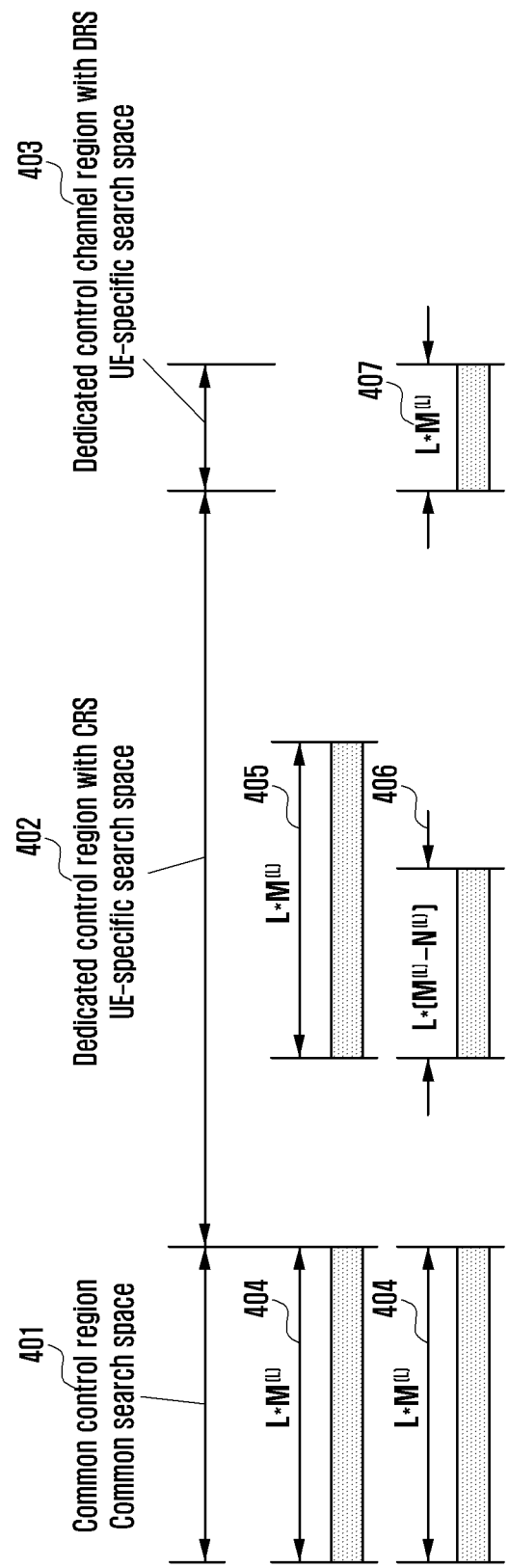
FIG. 4 is a diagram illustrating the control channel region with a dedicated control channel carrying a dedicated reference signal for use in the system, according to an embodiment of the present invention.

FIG. 4 is a diagram illustrating the control channel region with a dedicated control channel carrying a dedicated reference signal for used in the system, according to an embodiment of the present invention.

Referring to FIG. 4, the control channel includes a common control channel region 401, a dedicated control channel region 402 with a CRS, and a dedicated control channel region with a DRS 403. In the following description, the dedicated control channel with the CRS is referred to as the first control channel, and the dedicated control channel with DRS is referred to as the second control channel. In the following description, the terms 'control channel region' and 'control channel resource' are used interchangeably.

The legacy UE uses the resources denoted by reference numbers 404 and 405 as the control channel region with the CRS, which relates to the use of the common control channel and the dedicated control channel with the CRS. The UE that is capable of using the dedicated control channel with the DRS uses the control channel region including the resources denoted by reference numbers 404, 406, and 407, which relates to the use of the common control channel, the dedicated control channel with the CRS, and dedicated control channel with the DRS.

According to Table 1, the control channel region that is actually to be used is determined by $L*M^{(L)}$. In this case, the regions 404 and 405 use the conventional value. Although the configuration of the control channel region 404 in embodiments of the present invention is the same as the conventional one, the dedicated control channel region with the CRS is reduced as much as $L(M^{(L)}-N^{(L)})$ because the dedicated control channel region with DRS increases as much as $L*N^{(L)}$. Specifically, the system is capable of adjusting the dedicated control channel region using the control channel region $N^{(L)}$ with the DRS. Embodiments of the present invention incorporate a method for determining $N^{(L)}$ and a method for indicating $N^{(L)}$.

The method for determining and indicating $N^{(L)}$, according to an embodiment of the present invention, determines $N^{(L)}$ based on information such as control channel PRB resource region for DRS transmission, a maximum number of DRS ports, a Scrambling Code IDentifier (SCID) used by the DRS, and an available control channel size (number of bits). Specifically, the size of the dedicated control channel region with the DRS is determined according to the number of PRBs used for the dedicated control channel for the DRS, the number of DRS ports, and the number of bits of the control channel available in blind demodulation. According to an embodiment of the present invention, the eNB may transmit, to the UE, the control information as described above, through higher layer signaling, such as Radio Resource Control (RRC) signaling.

In more detail, when the eNB provides the UE with the information on all of the control channel PRB resource region for DRS transmission, the maximum number of available DRS ports, the CSID used for DRS, and the number of bits of the control channel; it is possible to match the decrease of the control channel region with the CRS to the increase of the control channel region with the DRS.

When the eNB notifies the UE of some of the aforementioned information, the control channel region with the CRS and the control channel region with the DRS increase/decrease at different ratios.

Figure 5:
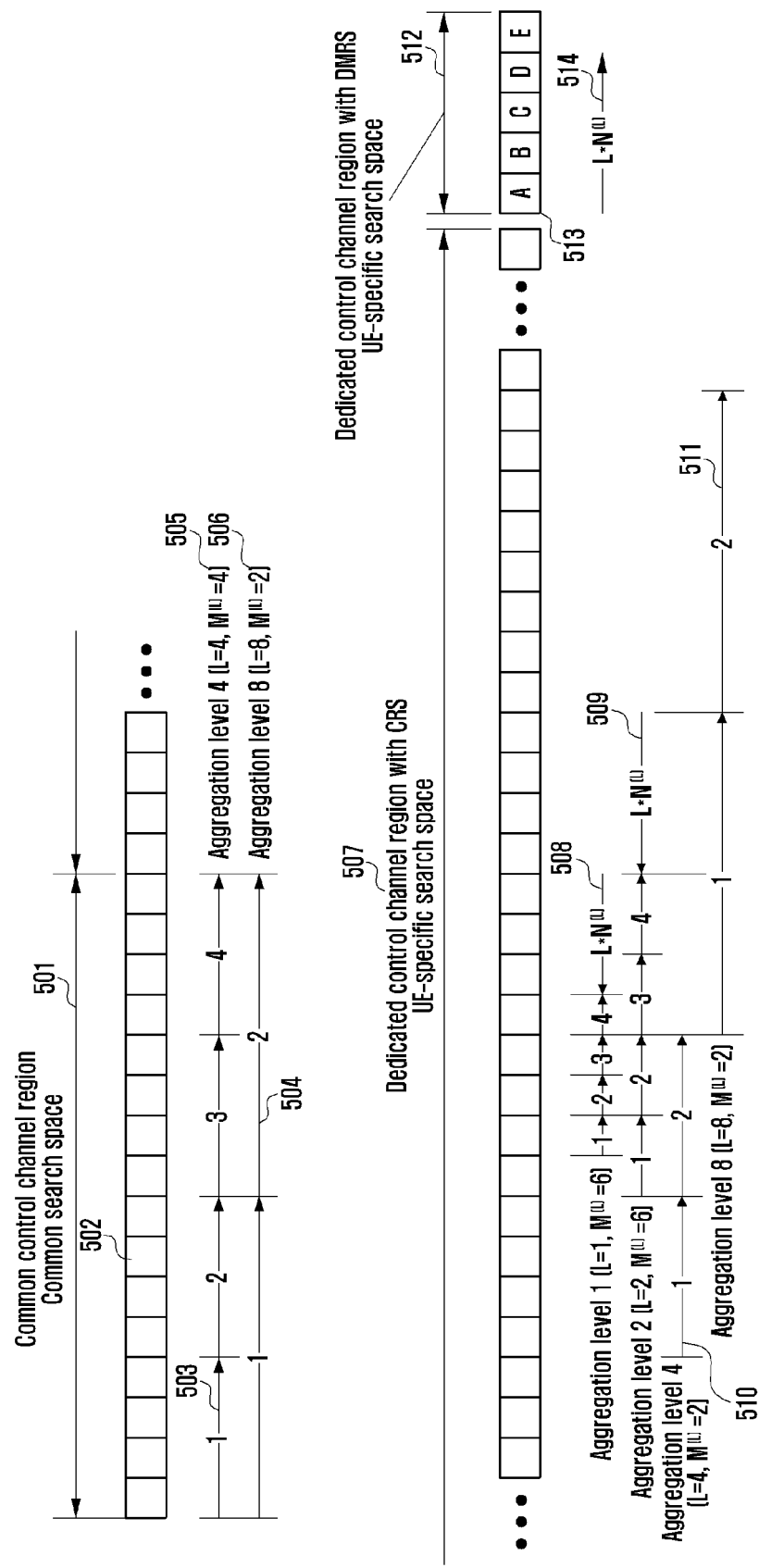
FIG. 5 is a diagram illustrating a control channel structure, according to an embodiment of the present invention.

FIG. 5 is a diagram illustrating a control channel structure, according to an embodiment of the present invention. A description is made of the control channel structure according to an embodiment of the present invention in view of the physical resource.

First, a brief description is made of FIG. 5. Reference number 501 denotes a logical region on which the common control channel is transmitted in the logical transmission region of the control channel transmitted with CRS. Reference number 502 denotes division of control channel region in unit of CCE. The common control channel is composed of total 16 CCEs, and the rest CCEs are used as dedicated control channel region. In the LTE system, the control channel has no specific code rate, and the rate of information amount to resource is determined in unit of aggregation level (hereinafter, the same is applied). The common reference signal is available with the aggregation levels 4 and 8 while the dedicated control channel is available with the aggregation levels 1, 2, 4, and 8. The unit of aggregation is CCE.

Reference number 503 denotes a blind demodulation region according to the aggregation level in the common dedicated control channel region. For the available aggregation level 4, total 4 regions can be used as denoted by reference number 503 (505), while total 2 regions can be used for the available 8 as denoted by reference number 504 (506). Accordingly, the eNB can transmit the common control channel across total 6 regions.

Reference number 507 denotes the logical region carrying the UE-specific control channel in the logical transmission region of the control channel transmitted with CRS.

As shown in FIG. 5 according to an embodiment of the present invention, the control channel, according to an embodiment of the present invention, maintains the same size as the conventional control channel region, while configuring the control channel region with the DRS in a new time/frequency resource region 512. The resource region 512 is a dedicated control region with the dedicated channel reference signal. All of the UEs receive signals on the common control channel region as in the conventional system, however regions 508, 509, 510, and 511 are reduced as much as the increased control channel region, as denoted by reference number 514.

The control channel region with the CRS has two control channel bits available without use of the DRS port and the SCID, and since this differs from the control channel region with the DRS, the increase in the number of CCEs in one control channel region with the DRS does not mean a decrease in the number of CCEs in one control channel region with the CRS. Accordingly, there is a need to adjust the control channel region according to a given system configuration.

Figure 6:
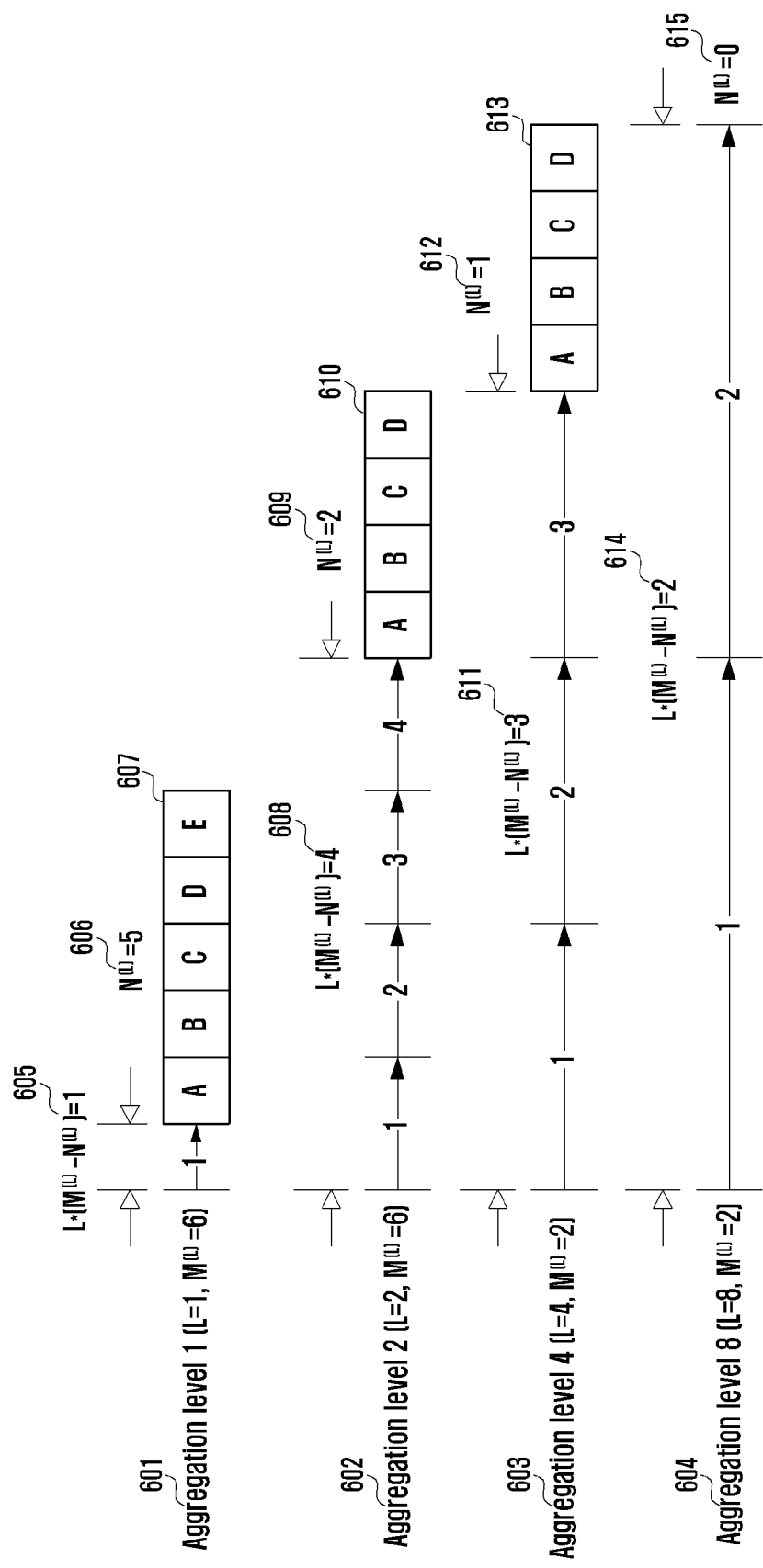
FIG. 6 is a diagram illustrating a method for configuring a control channel, according to an embodiment of the present invention.

FIG. 6 is a diagram illustrating a method for configuring a control channel, according to an embodiment of the present invention.

An embodiment of the present invention provides a method for matching the decrease of the control channel region with the CRS to the increase of the control channel region with the DRS. In order to accomplish this, the eNB sends the UE a PRB index and an SCID for the control channel region with the DRS through higher layer signaling (e.g., RRC signaling). If the SCID is not transmitted, the UE has to perform blind demodulation to acquire the SCID. If the SCID is transmitted to the UE through higher layer signaling, it is possible to avoid an increase in the number of blind demodulations. The maximum number of common reference signals for the DRS is limited to 2. The maximum number of reference signals available for the UE is notified through higher layer signaling. The system limits the blind demodulation of the UE to the size of one control channel.

For the conventional dedicated control channel with the CRS, no blind demodulation is performed for the DRS or the SCID. Since a single blind demodulation can be attempted for a size as large as two control channels, it is necessary to perform the demodulation twice. Since two different sizes are allowed per modulation for total 22 blind modulations in Table 1, 44 blind demodulations are required. When configuring the dedicated control channel with the DRS, according to an embodiment of the present invention, a single blind demodulation requires two blind decoding attempts for decoding a DRS port. The decreased amount of the CRS control channel resource matches the increased amount of the DRS control channel resource. $N^{(L)}$ for the DRS control channel is determined according to Equation (3) below.

$$N^{(L)} = \min(M^{(L)}, \lfloor N_{VRB}^{E-PDCCH}/L \rfloor) \quad (3)$$

Table 2 shows the control channel region with the CRS when the control channel for the DRS is configured. The entire region decreases from $L*M^{(L)}$ to $L*(M^{(L)}-N^{(L)})$.

TABLE 2

| Type | Aggregation level L | Size in CCEs | Number of PDCCH candidates $M^{(L)}$ |
|---|---|---|---|
| UE-specific | 1 | 1 * (6 − $N^{(1)}$) | 6 |
|  | 2 | 2 * (6 − $N^{(2)}$) | 6 |
|  | 4 | 4 * (2 − $N^{(4)}$) | 2 |
|  | 8 | 8 * (2 − $N^{(8)}$) | 2 |
| Common | 4 | 16 | 4 |
|  | 8 | 16 | 2 |

The dedicated control channel for the DRS can be expressed as shown in Table 3 below.

TABLE 3

| Type | Aggregation level L | Size in PRBs | Number of PDCCH candidates $N^{(L)}$ |
|---|---|---|---|
| UE-specific | 1 | 1 * $N^{(1)}$ | $N^{(1)}$ |
|  | 2 | 2 * $N^{(2)}$ | $N^{(2)}$ |
|  | 4 | 4 * $N^{(4)}$ | $N^{(4)}$ |
|  | 8 | 8 * $N^{(8)}$ | $N^{(8)}$ |

Equation (1), which expresses the search space, is modified as Equations (4) shown below.

$$m=0,\ldots,M^{(L)}-N^{(L)}-1, L \cdot \{(Y_k+m) \bmod \lfloor N_{CCE,k}/L \rfloor\}+i$$

$$m=M^{(L)}-N^{(L)},\ldots,M^{(L)}-1 n_{VRB}^{E-PDCCH}=(L \cdot m+i) \bmod N_{VRB}^{E-PDCCH} \quad (4)$$

where $N_{CCe,k}$ can be expressed as $N_{VRB}^{E-PDCCH}$, and refers to the basic unit of control channel demodulation. For the common control channel and the control channel for the DRS, $Y_k$ is set to 0, Since the control channel for the DRS is provided to the UE through higher layer signaling, there is no need to protect collisions between UEs.

As described above, this embodiment of the present invention provides a method for maintaining the total number of demodulation operations to be equal to the case of the control channel for the CRS. Specifically, this embodiment of the present invention configures the control channel for the DRS so as to limit the number of DRS ports to 2 and the number of bits of the control channel to 1. This results in a reduction in the number of demodulation operations, along with a further reduction by transmitting SCID through higher layer signaling. Thus, it is possible to match the control channel to the physical resource one by one, so as to maintain the total size of the control channel resource region to be equal to that of the conventional control channel resource region per UE.

Accordingly, when 5 PRBs 607 of the control channel for the DRS are allocated at aggregation level 1 601, the UE performs demodulation on the 5 control channel resources at the resource region for the DRS with the exception of the conventional control channel for the CRS, which is reduced to 1 as denoted by reference number 605, while the resource region for the DRS is set to 5 as denoted by reference number 606. For aggregation level 2 602, since up to 2 size 2 resources can be allocated, among the 5 assigned PRBs, the convention resource region for the CRS is reduced to 4 as denoted by reference number 608, while the resource region for the DRS is set to 2 as denoted by reference number 609. Likewise, for aggregation level 4 603, the conventional region is reduced to 3 as denoted by reference number 611, while the control region for the DRS is set to 1 as denoted by reference number 612. For aggregation level 8 604, since the resource allocated for the DRS is 5, the control channel of size of 8 cannot be transmitted such that there is no reduction of the conventional resource region with the CRS. Accordingly, it is possible to use both the control channel region for the CRS and the control channel region for the DRS without increasing of the number of demodulation operations at the legacy UE.

Brief descriptions are made of the other reference numbers used in FIG. 6 hereinafter. Reference number 610 denotes the logical resource of the control channel transmitted with DMRS at aggregation level 2, and reference number 613 is the logical resource of the control channel transmitted with DMRS at aggregation level 4.

Reference number 614 denotes the value obtained by deducing the available control channel candidates from the total control channel candidates using DMRS (accordingly, 2 is the number of control channel candidates transmittable with CRS). Reference number 615 denotes that the number of DMRS control channel candidates using aggregation level 8 is 0 in the exemplary case of FIG. 6.

Figure 7:
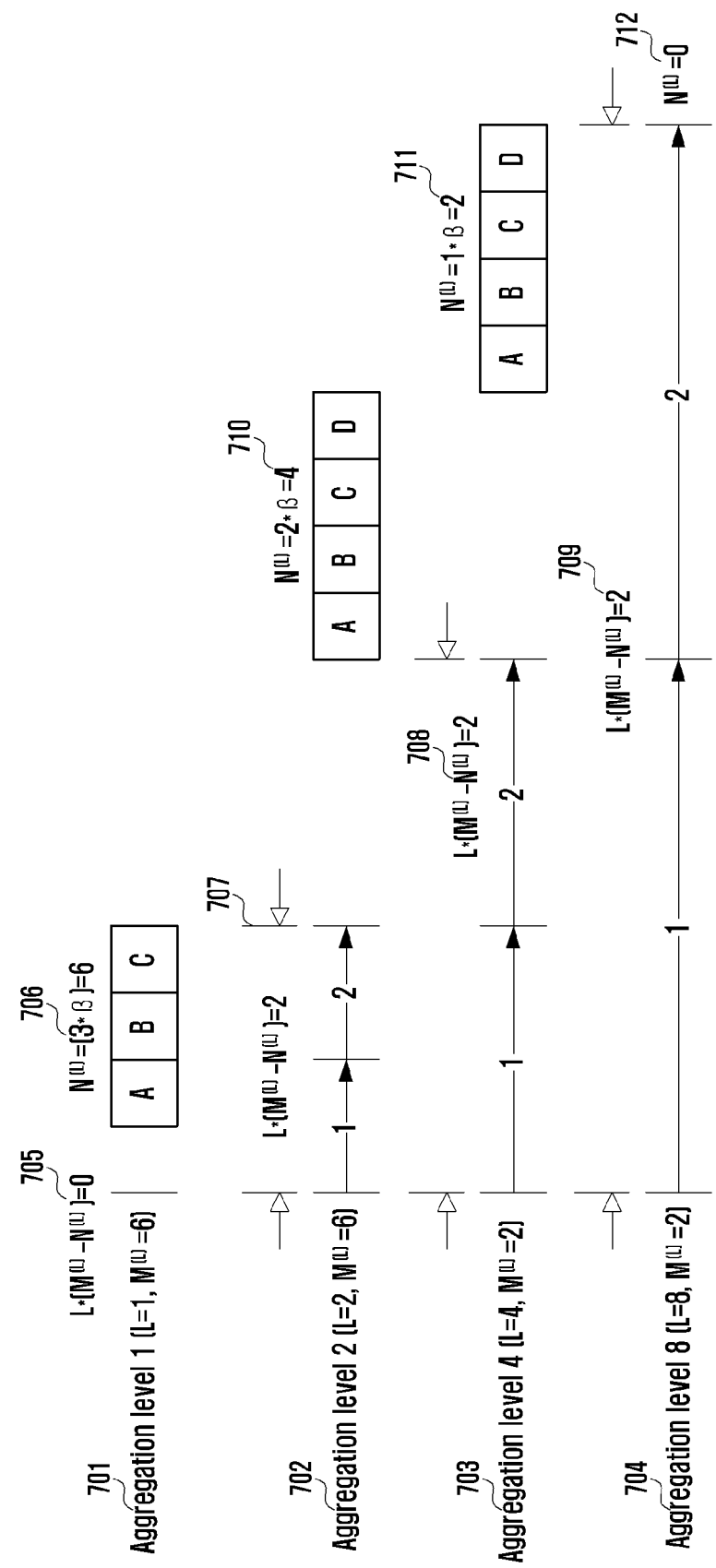
FIG. 7 is a diagram illustrating a method for configuring the control channel for a Common Reference Signal (CRS) and the control channel for a DRS at an asymmetric ratio by applying a weight to the control channel for DRS depending on the UE characteristics, according to an embodiment of the present invention.

FIG. 7 is a diagram illustrating a method for configuring the control channel for the CRS and the control channel for the DRS at an asymmetric ratio by applying a weight to the control channel for the DRS depending on the UE characteristics, according to an embodiment of the present invention.

When there is no restriction, the control channel for the DRS can multiplex 8 users with up to 4 DRS ports and 2 SCIDs, and have two or more control channel format sizes. Accordingly, the number of blind demodulations is determined by Equation (5) below.

Number of blind demodulations=(maximum number of DRS ports)×(number of DRS control channel formats) (5)

The number of blind demodulation for the CRS is determined by Equation (6) below.

Number of blind demodulations=(number of CRS control channel formats) (6)

Accordingly, there is a difference between the numbers of blind demodulations per control channel region. In order to adjust the physical control channel resource ratio according to the system environment configured at the current UE, a new parameter is introduced as shown in Equation (7) below.

β=number of blind demodulations for DRS/number of blind demodulation for CRS=(maximum number of DRS ports)×(number of control channel formats)/number of CRS control channel formats (7)

Accordingly, $N^{(L)}$ can be defined as shown in Equation (8) below.

$$N^{(L)} = \min(M^{(L)}, \beta \cdot \lfloor N_{VRB}^{E\text{-}PDCCH}/L \rfloor)$$ (8)

FIG. 7 shows an embodiment in which the maximum number of DRS ports is 2, the number of SCIDs is 2, and the number of control channel formats is 1. In this embodiment, β becomes 2 such that the control channel region for the CRS is changed to the control region for the DRS as denoted by reference number 706, at aggregation level 1 701. Here, reference number 705 denotes the value obtained by deducing the available control channel candidates from the entire control channel candidates using DMRS (accordingly, 0 is the number of control channel candidates transmittable with CRS).

At aggregation level 2 702, the size of the control channel for the DRS becomes 4 as denoted by reference number 710, resulting in two physical resources. However the total number of available blind demodulations becomes 4, and thus, a conventional CRS control channel region 707 decreases to 2. Likewise, at aggregation level 4 703 and aggregation level 8 704, the control channel for the DRS is configured as denoted by reference numbers 711 and 712, such that the control channel regions for the CRS are reduced as denoted by reference numbers 708 and 709.

As described above, this embodiment of the present invention provides a method for adjusting the relative ratio between the control channel for the CRS and the control channel for the DRS, according to the system environment of the UE using the DRS. The method according to this embodiment of the present invention derives the ratio 13 between the number of blind demodulations for the DRS and the number of blind demodulations for the CRS based on the system information to obtain the value $N^{(L)}$ for determining the control channel region.

According to another embodiment of the present invention, a method is provided for determining the control channel region through higher layer signaling. In the above-described embodiments of the present invention, $N^{(L)}$ and β are determined according to the given environmental variable and data transmission mode, and the UE calculates the corresponding value using these parameters. In this embodiment of the present invention, however, the eNB notifies of the $N^{(L)}$ and β through higher layer signaling. $N^{(L)}$ denotes the control channel region per aggregation and the RRC signaling for UE's control channel includes the following parameter.

BlindDecodingOFEPDDCH={$N^{(1)}, N^{(2)}, N^{(4)}, N^{(8)}$}

If this signal is received, the UE adjusts the control channel region by referencing Tables 2 and 3.

Meanwhile, β is a variable for adjusting the ratio between the control channel for the CRS and the control channel for the DRS and, if this variable is received through higher layer signaling, the RRC signaling for control channel of the UE includes the following parameter.

RatioOFePDCCH={β}

When β is informed, Equation 8 should be recorded in the UE, and the UE adjusts the control channel region by referencing Tables 2 and 3. Here, ePDCCH is the control channel transmitted based on DMRS which is designed to be transmittable on a specific frequency region, unlike the conventional control channel (PDCCH) transmitted as distributed across the entire band, such that both the beamforming transmission and spatial diversity transmission are possible with DMRS.

In another embodiment of the present invention, a method is provided for determining the control channel region based on the data recoded in the UE. This control channel region determination method determines the control channel region based on the data previously recorded in the UE without extra signaling or UE processing. The UE receives only the PRB region of the control channel for the DRS through higher layer signaling and reads out the given resource region according to the resource amount of the given PRBs. Table 4 shows the sizes of the control channel according to the resource regions from PRB size 0 to 16. The corresponding size is determined by Equation 8.

may include configuring the control channel region based on the PRB resource region for the dedicated control channel, the port used for dedicated reference signal, the SCID, and the available Downlink Control Information (DCI) format size. In detail, according to an embodiment of the present invention, the step of configuring control channel region with dedicated control channel may include configuring the dedicated reference signal region based on a maximum number of ports used for dedicated reference signal and the PRB resource region. According to another embodiment of the present invention, the step of configuring control channel region with dedicated control channel may include configuring the dedicated reference signal region based on the maximum number of ports used for dedicated reference signal, the SCID, the available DCI format size, and the PRB resource region. According to an additional embodiment of

TABLE 4

| level | KL | \multicolumn{2}{c}{Aggregation 0} | \multicolumn{2}{c}{1} | \multicolumn{2}{c}{2} | \multicolumn{2}{c}{3} | \multicolumn{2}{c}{4} | \multicolumn{2}{c}{5} | \multicolumn{2}{c}{6} | \multicolumn{2}{c}{7} | \multicolumn{2}{c}{8} |
|---|---|---|---|---|---|---|---|---|---|---|---|---|---|---|---|---|---|---|
| | | NL | | NL | | NL | | NL | | NL | | NL | | NL | | NL | | NL |
| 1 | 6 | 6 | 0 | 5 | 1 | 4 | 2 | 3 | 3 | 2 | 4 | 1 | 5 | 0 | 6 | 0 | 6 | 0 | 6 |
| 2 | 6 | 6 | 0 | 6 | 0 | 5 | 1 | 5 | 1 | 4 | 2 | 4 | 2 | 3 | 3 | 3 | 3 | 2 | 4 |
| 4 | 2 | 2 | 0 | 2 | 0 | 2 | 0 | 2 | 0 | 1 | 1 | 1 | 1 | 1 | 1 | 1 | 1 | 0 | 2 |
| 8 | 2 | 2 | 0 | 2 | 0 | 2 | 0 | 2 | 0 | 2 | 0 | 2 | 0 | 2 | 0 | 2 | 0 | 1 | 1 |

| level | KL | \multicolumn{2}{c}{Aggregation 9} | \multicolumn{2}{c}{10} | \multicolumn{2}{c}{11} | \multicolumn{2}{c}{12} | \multicolumn{2}{c}{13} | \multicolumn{2}{c}{14} | \multicolumn{2}{c}{15} | \multicolumn{2}{c}{16} |
|---|---|---|---|---|---|---|---|---|---|---|---|---|---|---|---|---|---|
| | | NL | | NL | | NL | | NL | | NL | | NL | | NL | | NL |
| 1 | 6 | 0 | 6 | 0 | 6 | 0 | 6 | 0 | 6 | 0 | 6 | 0 | 6 | 0 | 6 | 0 | 6 |
| 2 | 6 | 2 | 4 | 1 | 5 | 1 | 5 | 0 | 6 | 0 | 6 | 0 | 6 | 0 | 6 | 0 | 6 |
| 4 | 2 | 0 | 2 | 0 | 2 | 0 | 2 | 0 | 2 | 0 | 2 | 0 | 2 | 0 | 2 | 0 | 2 |
| 8 | 2 | 1 | 1 | 1 | 1 | 1 | 1 | 1 | 1 | 1 | 1 | 1 | 1 | 1 | 1 | 0 | 2 |

The above described embodiments of the present invention are summarized as a method for receiving a dedicated control channel for a dedicated reference signal. Information on the dedicated control channel is received. A control channel region with the dedicated control channel is configured using the received information. The control channel region with the common reference signal is adjusted based on the configured region. The control channel is demodulated on the dedicated control channel region.

According to an embodiment of the present invention, the step of receiving the dedicated control channel information may include reception of the PRB resource region necessary for receiving the dedicated control channel and reception of the SCID used for the dedicated reference signal. According to another embodiment of the present invention, the step of receiving the dedicated control channel information may include reception of the PRB resource region necessary for receiving the dedicated control channel. According to an additional embodiment of the present invention, the step of receiving the dedicated control channel information may include reception of a PRG resource region necessary for receiving the dedicated control channel region and reception of a number of demodulations per aggregation level. According to a further embodiment of the present invention, the step of receiving the dedicated control channel information may include reception of a PRB resource region necessary for receiving dedicated control channel, and referencing a demodulation number table stored in the UE.

The step of configuring the control channel region with the dedicated control channel using the received information the present invention, the dedicated reference signal region may be configured based on the indication through higher layer signaling. According to a further embodiment of the present invention, the dedicated reference signal region can be configured according to the information recorded, in the UE, based on the length of the PRB resource.

The step of adjusting the control channel region with the common reference signal based on the configured region may include adjusting the control channel region using the common reference signal by fixing total number of demodulations.

The step of demodulating the control channel on the dedicated control channel region may include selection of decoding candidates, checking a used reference signal, demodulating the DCI format, and demodulating the aggregation level.

Figure 8:
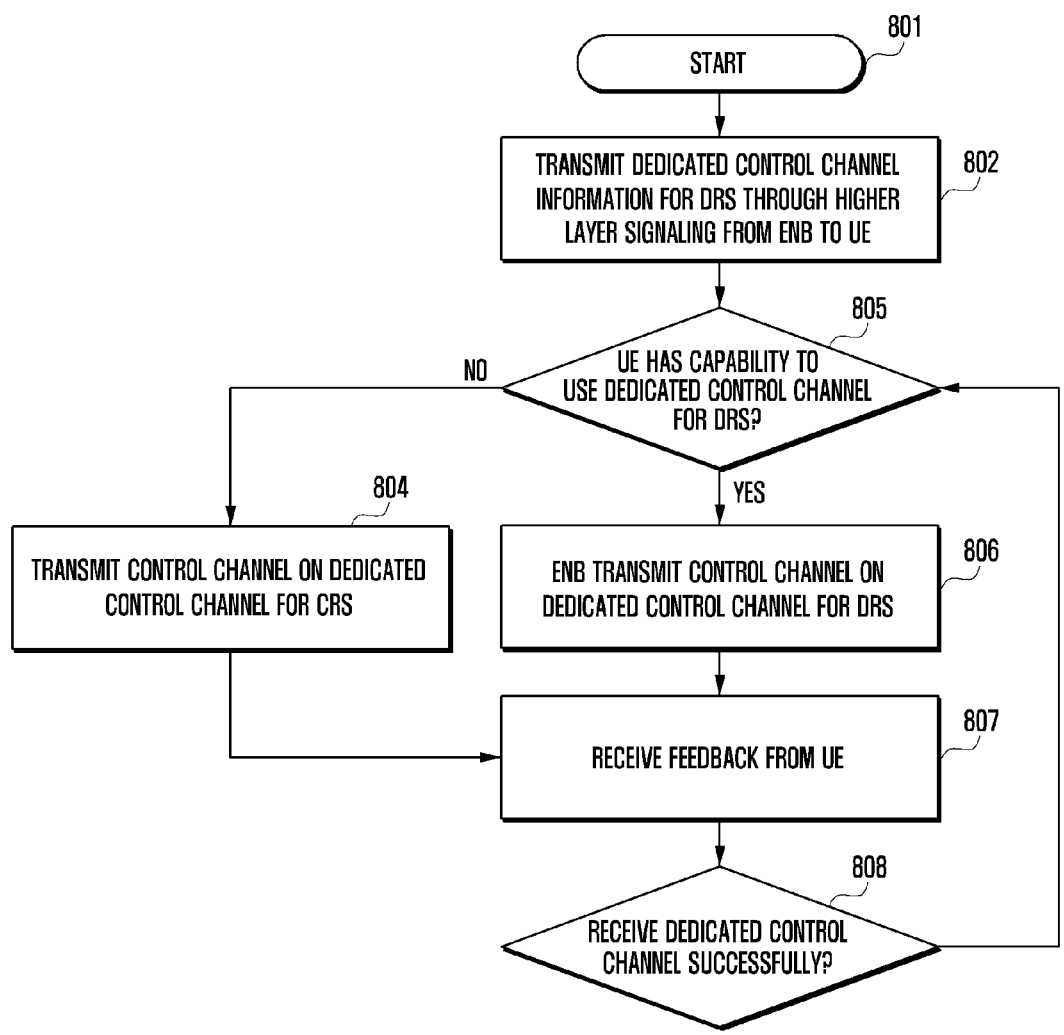
FIG. 8 is a flowchart illustrating a transmission procedure of the eNB, according to an embodiment of the present invention.

FIG. 8 is a flowchart illustrating a transmission procedure of the eNB, according to an embodiment of the present invention.

Referring to FIG. 8, the eNB starts scheduling a UE at step 801. The eNB first generates dedicated control information in order for the UE to receive a dedicated control channel for dedicated reference signal. The eNB transmits the dedicated control channel information for the dedicated reference signal to the UE through higher layer signaling, at step 802. This incorporates the methods for signaling the information on the number of DRS ports and the SCID, and for signaling the size of the control channel region, as provided in different embodiments of the present invention described above.

The eNB determines whether the UE has the dedicated capability of using the dedicated control channel for dedicated reference signal, at step 805. More specifically, the eNB checks whether the UE can receive the control channel with the DRS. If it is determined that the UE has the capability of using the dedicated control channel, the eNB transmits the control channel using the dedicated control channel for the dedicated reference signal, at step 806. If it is determined that the UE does not have the capability of using the dedicated control channel, the eNB transmits the control channel using the dedicated control channel for the common reference signal, at step 804. After transmitting the control channel in either step 804 or 806, the eNB receives feedback from the UE, at step 807. The eNB determines, based on the feedback, whether the UE has received the control channel successfully, at step 808, before the methodology returns to step 805.

Figure 9:
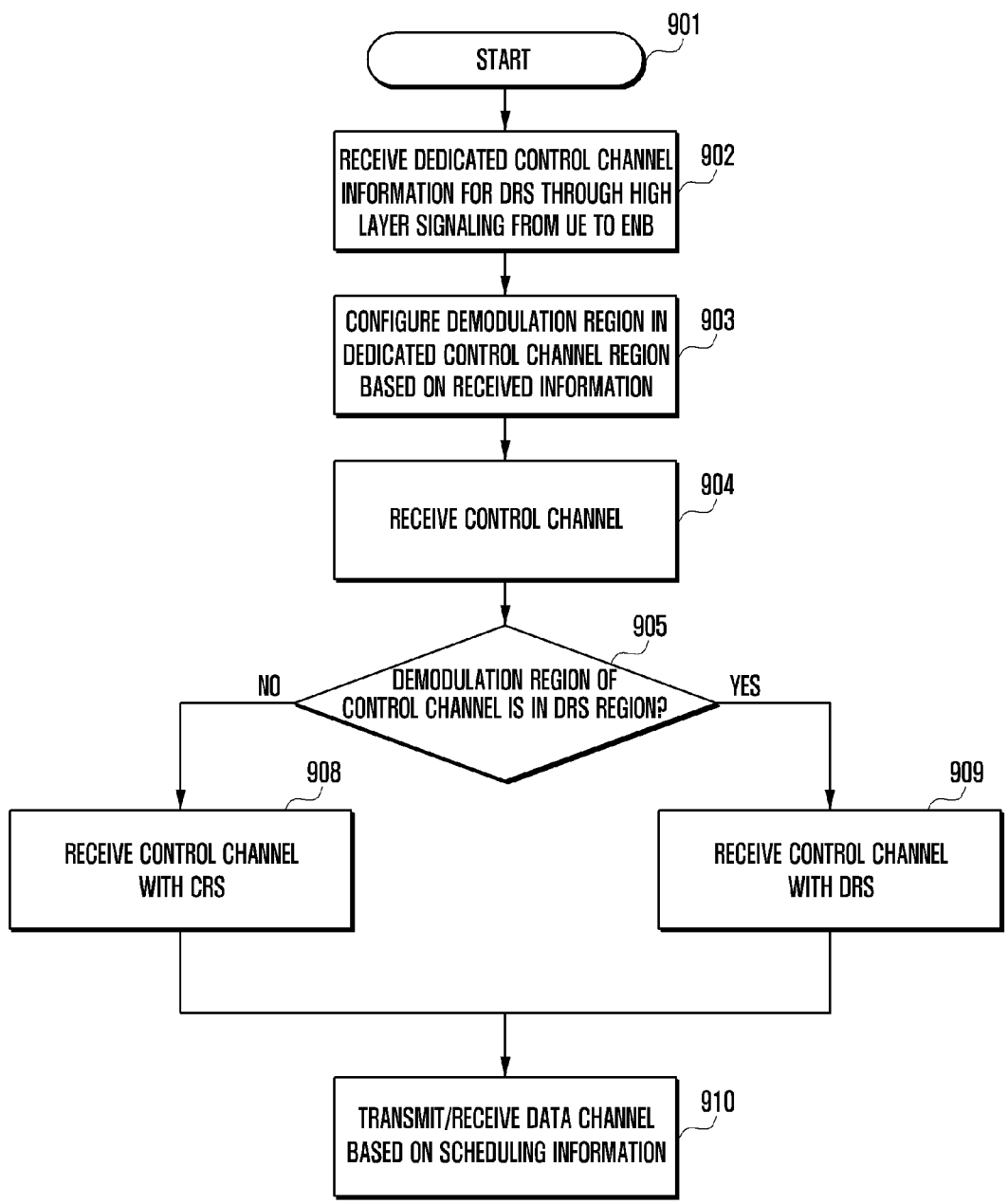
FIG. 9 is a flowchart illustrating a reception procedure of the UE, according to an embodiment of the present invention.

FIG. 9 is a flowchart illustrating a reception procedure of the UE, according to an embodiment of the present invention.

Referring to FIG. 9, the UE starts receiving channels from the eNB, at step 901. The UE receives dedicated control channel information for the dedicated reference signal from the eNB through higher layer signaling, at step 902. The dedicated control channel information includes at least one of PRB information on the dedicated control channel for the dedicated reference signal, information on the port used for the dedicated reference signal, SCID information, and DCI format size information.

The UE configures the dedicated control channel region based on the received information, at step 903. The dedicated control channel region configuration includes steps of determining dedicated control channel resource for the dedicated reference signal based on dedicated control channel information, and determining the dedicated control channel resource for common control signal according to the dedicated control channel resource for the dedicated reference signal determined among the entire control channel resource. The UE may determine the dedicated control channel resource for the dedicated reference signal according to Equation (8).

The UE receives the control channel, at step 904. The UE determines whether the demodulation region of the control channel is the dedicated reference signal region, at step 905. If the demodulation region of the control channel is not the dedicated reference signal region, the UE estimates the channel based on the common reference signal and receives the control channel on the estimated channel, at step 908. If the demodulation region of the control channel is the dedicated reference signal, the UE receives the control channel using the dedicated reference signal, at step 909. Finally, the UE receives or transmits data based on the scheduling information carried in the received control channel, at step 910.

Figure 10:
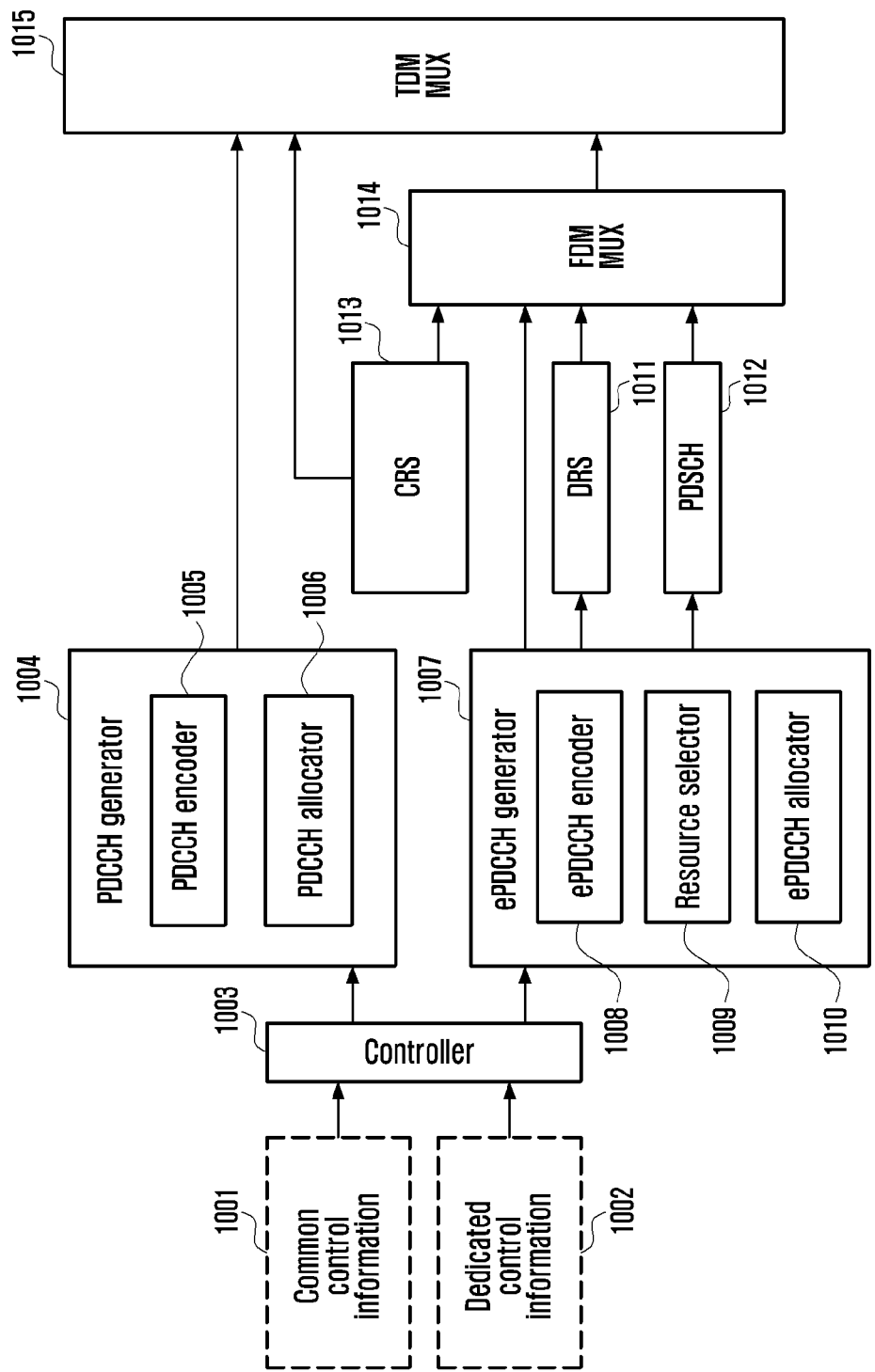
FIG. 10 a block diagram illustrating a configuration of a transmitter of the eNB, according to an embodiment of the present invention.

FIG. 10 a block diagram illustrating a configuration of a transmitter of the eNB, according to an embodiment of the present invention. The transmitter of the eNB, according to an embodiment of the present invention, is capable of transmitting, to the UE, the first control channel (the dedicated control channel with the CRS) and the second control channel (the dedicated control channel with the DRS).

In FIG. 10, a common control channel 1001 a dedicated control channel 1002 are transmitted to the UE. A controller 1003 determines whether to transmit the common control channel 1001 and the dedicated control channel 1002 by means of a PDCCH generator 1004 for generating a PDCCH as the control channel using the CRS or by means of a ePDCCH generator 1007 for generating the control channel using the DRS. If it is determined to transmit the control channel by means of the PDCCH transmitter 1004, the controller 1003 maps the control channel to the location by means of a PDCCH encoder 1005 and a PDCCH allocator 1006 in order for the UE to receive the control channel. The PDCCH generated by the PDCCH generator 1004 is multiplexed with a CRS 1013 by means of a Time Division Multiplexing (TDM) multiplexer 1015.

If it is determined to transmit the control channel by means of the ePDCCH generator 1007, the controller 1003 controls the ePDCCH generator 1007 to transmit the control channel. The eNB determines the PRBs, in the whole bandwidth, and SCID for use in transmitting the control channel by means of a resource selector 1009. The eNB arranges the control channel at position where the UE can receive by means of an ePDCCH allocator 1010.

Among PDCCH and ePDCCH, if the scheduler determines to transmit the control channel on the ePDCCH, the ePDCCH encoder 1008 encodes the controls channel to be appropriate for receiving DMRS (because the entire available resource and coding rate may differ from those of PDCCH).

The ePDCCH generated by the ePDCCH generator 1007 is multiplexed with the DRS 1011 and a Physical Downlink Shared CHannel (PDSCH) 1012 by means of a Frequency Division Multiplexer (FDM) multiplexer 1014 and then multiplexed with the PDCCH and the CRS 1013 by means of the TDM multiplexer 1015.

The controller 1003, according to an embodiment of the present invention, may generate control information necessary for the UE to receive the second control channel. The UE determines the second control channel resource using the control information, and the first control channel resource according to the second control channel resource in the entire control channel resource. The control information may include at least one of PRB resource information for the second control channel, information on the port used for dedicated reference signal, SCID information, and DCI format size information.

The transmitter of the eNB may include a communication unit for transmitting the control information through higher layer signaling and transmitting the first and second control channels to the UE.

Figure 11:
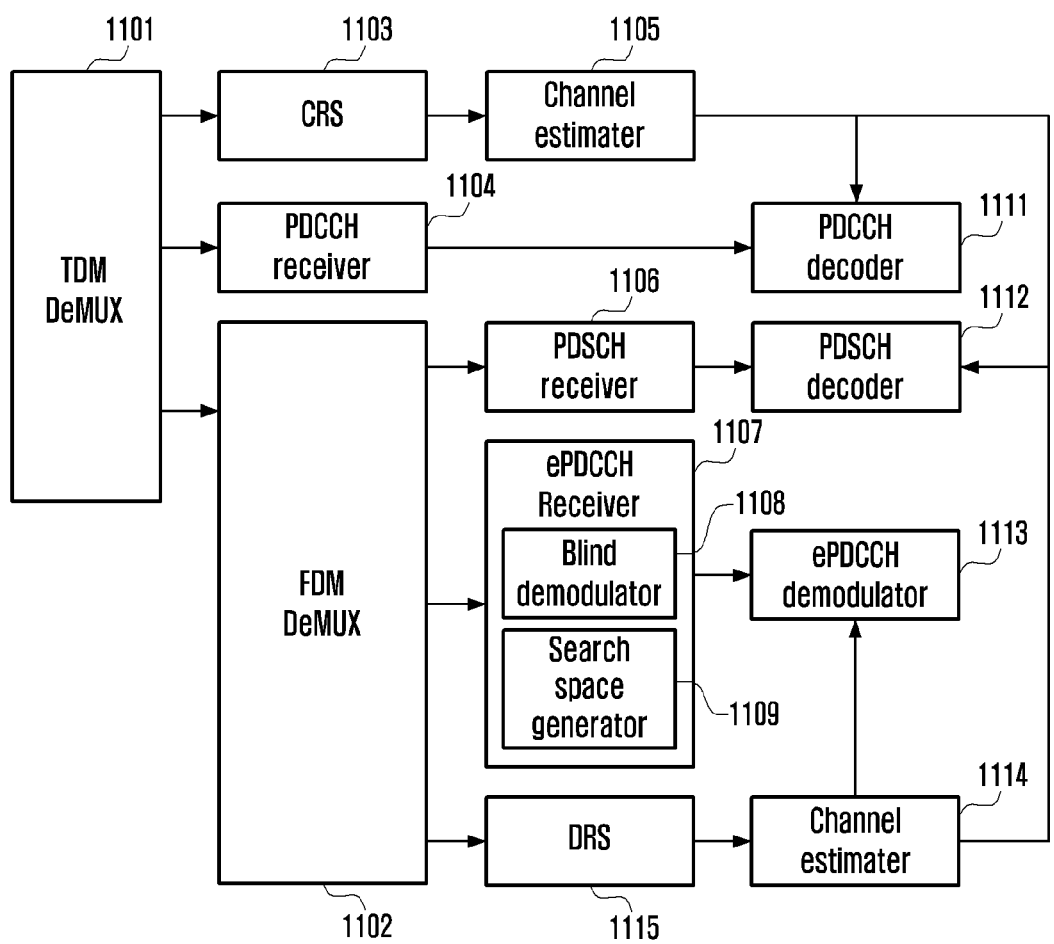
FIG. 11 is a block diagram illustrating a configuration of a receiver of the UE, according to an embodiment of the present invention.

FIG. 11 is a block diagram illustrating a configuration of a receiver of the UE, according to an embodiment of the present invention. The receiver of the UE, according to an embodiment of the present invention, is capable of receiving the first control channel (the dedicated control channel with the CRS) and the second control channel (the dedicated control channel with the DRS).

Referring to FIG. 11, the UE separates the signal into a control channel region and a data region by means of a TDM demultiplexer 1101 and separates a CRS 1103 from the control channel region and sends the CRS 1103 to a channel estimator 1105. The UE receives the PDCCH by means of a PDCCH receiver 1104 in the control channel region, and receives the control channel region with the CRS 1103 by means of a PDCCH decoder 1111, using the channel information estimated by the channel estimator 1105. The data region is demultiplexed into PDSCH and ePDCCH control channels by an FDM demultiplexer 1102, such that the PDSCH is received by means of a PDSCH receiver 1106 and the ePDCCH is received by means of an ePDCCH receiver 1107. If the control channel is received on PDCCH or ePDCCH, the PDSCH receiver 1112 demodulates the PDSCH information based on the received control channel.

A DRS 1115 of the data channel region is sent to a DRS channel estimator 1114. The ePDCCH receiver 1107 receives the ePDCCH control channel by means of a blind demodulator 1108 and a search area generator 1109 and completes control channel reception process by means of an ePDCCH demodulator 1113 using the DRS channel estimation information from the channel estimator 1114.

The receiver of the UE, according to an embodiment of the present invention, may further include a controller and a communication unit.

The communication unit receives the control information for receiving the second control channel from the eNB through higher layer signaling.

The controller determines the second control channel resource using the control information and determines the first control channel resource according to the second control channel resource determined in the entire control channel resource. The control information may include at least one of the PRB resource information for the second control channel, information on the port used for the dedicated reference signal, SCID information, and DCI format size information.

As described above, the method and apparatus for transmitting the dedicated control channel for the dedicated reference signal, according to embodiments of the present invention, enables the UE to receive a control channel having an increased amount of the dedicated control channel with the DRS, as compared to the conventional method, efficiently without an increase in the number of blind demodulation operations. Also, the method and apparatus for transmitting the dedicated control signal for the dedicated reference signal, according to embodiments of the present invention, is capable of managing the resources for the dedicated control channel region with the CRS and the dedicated control channel region with the DRS by efficiently using the signaling information on the dedicated control channel transmitted by the eNB. Furthermore, the method and apparatus for transmitting the dedicated control channel for the dedicated reference signal is advantageous in managing the resources of the control channel regions efficiently, according to the UE condition and the data channel transmission scheme.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method for receiving, by a user equipment (UE), a first control channel and a second control channel in a wireless communication system, the method comprising the steps of:
   receiving control information for the second control channel from a base station through higher layer signaling, the control information including information for a physical resource block (PRB) and information for scrambling of a second reference signal;
   monitoring the second control channel associated with the second reference signal on a second resource based on the information for the PRB; and
   monitoring the first control channel associated with a first reference signal on a first resource,
   wherein the first resource is defined by a downlink bandwidth and a first set of orthogonal frequency division multiplex (OFDM) symbols in a subframe, and the second resource is defined by at least one PRB indicated by the information for the PRB and a second set of OFDM symbols in the subframe.

2. The method in claim 1, wherein the first control channel includes a Physical Downlink Control CHannel (PDCCH), and the second control channel includes an enhanced Physical Downlink Control CHannel (ePDCCH).

3. The method in claim 1, wherein the control information further includes at least one of information for at least one reference signal, information for the subframe used for transmission of the second control channel, and information for Downlink Control Information (DCI) formation size.

4. The method in claim 1, wherein the first reference signal comprises a common reference signal and the second reference signal comprises a dedicated reference signal.

5. A user equipment (UE) for receiving a first control channel and a second control channel in a wireless communication system, the UE comprising:
   a communication unit configured to receive control information for the second control channel from a base station through higher layer signaling, the control information including information for a physical resource block (PRB) and information for scrambling of a second reference signal; and
   a controller configured to control monitoring the second control channel associated with a second reference signal on the second resource based on the information for the PRB, and to control monitoring the first control channel associated with a first reference signal on a first resource,
   wherein the first resource is defined by a downlink bandwidth and a first set of orthogonal frequency division multiplex (OFDM) symbols in a subframe, and the second resource is defined by at least one PRB indicated by the information for the PRB and a second set of OFDM symbols in the subframe.

6. The UE of claim 5, wherein the first control channel comprises a Physical Downlink Control CHannel (PDCCH), and
   wherein the second control channel comprises an enhanced Physical Downlink Control CHannel (ePDCCH).

7. The UE of claim 5, wherein the control information further comprises at least one of:
   information for at least one reference signal;
   information for the subframe used for transmission of the second control channel; and
   information for Downlink Control Information (DCI) formation size.

8. The UE of claim 5, wherein the first reference signal comprises a common reference signal and the second reference signal comprises a dedicated reference signal.

9. A method of a base station for transmitting a first control channel and a second control channel in a wireless communication system, the method comprising the steps of:
   generating control information for a User Equipment (UE), the control information including information for a physical resource block (PRB) and information for scrambling of a second reference signal;
   transmitting the control information to the UE through higher layer signaling; and
   transmitting at least one of the first control channel and the second control channel to the UE,
   wherein the second control channel associated with the second reference signal is transmitted on a second resource, and the first control channel associated with a first reference signal is transmitted on a first resource, and wherein the first resource is defined by a downlink bandwidth and a first set of orthogonal frequency division multiplex (OFDM) symbols in a subframe, and the second resource is defined by at least one PRB indicated by the information for the PRB and a second set of OFDM symbols in the subframe.

10. The method of claim 9, wherein the first control channel includes a Physical Downlink Control CHannel (PDCCH), and the second control channel includes enhanced Physical Downlink Control CHannel (ePDCCH).

11. The method of claim 9, wherein the control information further includes at least one of information for at least one reference signal, information for the subframe used for transmission of the second control channel and information for Downlink Control Information (DCI) formation size.

12. The method of claim 9, wherein the first reference signal comprises a common reference signal and the second reference signal comprises a dedicated reference signal.

13. A base station for transmitting a first control channel and a second control channel in a wireless communication system, the base station comprising:
a controller configured to control generating control information for a User Equipment (UE), the control information including information for a physical resource block (PRB) and information for scrambling of a second reference signal; and
a communication unit configured to transmit the control information to the UE through higher layer signaling, and to transmit at least one of the first control channel and the second control channel to the UE,
wherein the second control channel associated with the second reference signal is transmitted on a second resource, and the first control channel associated with a first reference signal is transmitted on a first resource, and
wherein the first resource is defined by a downlink bandwidth and a first set of orthogonal frequency division multiplex (OFDM) symbols in a subframe, and the second resource is defined by at least one PRB indicated by the information for the PRB and a second set of OFDM symbols in the subframe.

14. The base station of claim 13, wherein the first control channel comprises a Physical Downlink Control CHannel (PDCCH), and
wherein the second control channel comprises enhanced Physical Downlink Control CHannel (ePDCCH).

15. The base station of claim 13, wherein the control information further comprises at least one of:
information for at least one reference signal;
information for the subframe used for transmission of the second control channel; and
information for Downlink Control Information (DCI) formation size.

16. The base station of claim 13, wherein the first reference signal comprises a common reference signal and the second reference signal comprises a dedicated reference signal.

* * * * *